| (12) | United States Patent | (10) Patent No.: | US 8,989,176 B2 |
|---|---|---|---|
| | Luo et al. | (45) Date of Patent: | Mar. 24, 2015 |

(54) METHOD AND DEVICE FOR TRIGGERING NESTED SERVICE

(75) Inventors: Huiping Luo, Guangdong Province (CN); Yinjun Han, Guangdong Province (CN); Bin Guo, Guangdong Province (CN); Junjun Mei, Guangdong Province (CN)

(73) Assignee: ZTE Corporation, Shenzhen (CN)

( * ) Notice: Subject to any disclaimer, the term of this patent is extended or adjusted under 35 U.S.C. 154(b) by 226 days.

(21) Appl. No.: 13/378,203

(22) PCT Filed: May 11, 2010

(86) PCT No.: PCT/CN2010/072640
§ 371 (c)(1),
(2), (4) Date: Dec. 14, 2011

(87) PCT Pub. No.: WO2010/145354
PCT Pub. Date: Dec. 23, 2010

(65) Prior Publication Data
US 2012/0093148 A1 Apr. 19, 2012

(30) Foreign Application Priority Data
Jun. 15, 2009 (CN) .......................... 2009 1 0087039

(51) Int. Cl.
*H04L 12/66* (2006.01)
*H04L 29/06* (2006.01)

(52) U.S. Cl.
CPC ........ *H04L 65/1069* (2013.01); *H04L 65/1006* (2013.01)
USPC .......................................................... 370/352

(58) Field of Classification Search
CPC ........................ H04L 65/1069; H04L 65/1006
USPC .......................................... 709/227; 370/352
See application file for complete search history.

(56) References Cited

U.S. PATENT DOCUMENTS

| 2006/0018455 A1* | 1/2006 | Salomon et al. ............... 379/229 |
| 2006/0115068 A1* | 6/2006 | Dotan et al. ............ 379/221.15 |
| 2006/0177029 A1* | 8/2006 | Dotan et al. ............ 379/114.01 |
| 2012/0124222 A1* | 5/2012 | Noldus et al. .................. 709/227 |

FOREIGN PATENT DOCUMENTS

| CN | 1642307 A | 7/2005 |
| CN | 1859590 A | 11/2006 |
| CN | 1997166 A | 7/2007 |
| CN | 101094088 A | 12/2007 |
| CN | 101594357 A | 12/2009 |

OTHER PUBLICATIONS

International Search Report for PCT/CN2010/072640 dated Aug. 19, 2010.

* cited by examiner

*Primary Examiner* — Khaled Kassim
*Assistant Examiner* — Zhaohui Yang
(74) *Attorney, Agent, or Firm* — Banner & Witcoff, Ltd.

(57) ABSTRACT

The present invention discloses a method for triggering a nested service, which relates to the technique of broadband service triggering and service nesting. The present invention is proposed for solving the problem that the existing nested service occupies more system bandwidths, wherein the method includes: when receiving a call request of a nested service in a normal service flow, determining a service key of the nested service according to a called number of the nested service, taking the service key as a call access object, converting the call request of the nested service into a call access message in a service platform where a normal service is located, and triggering the nested service in the service platform. The present invention further discloses an apparatus for implementing the previously mentioned method. The present invention reduced the bandwidth resources consumed by the nested service, and the scheme is simple and practical.

4 Claims, 1 Drawing Sheet

METHOD AND DEVICE FOR TRIGGERING NESTED SERVICE

TECHNICAL FIELD

The present invention relates to the technique of broadband service triggering and service nested, and particularly, to a method and an apparatus for triggering a nested service based on a service platform.

BACKGROUND OF THE RELATED ART

With the continuous development of the broadband services, various service modes emerge endlessly; for different services in the same service platform, if entering from one service to another service, the nested mode of the existing broadband service is required to enter a soft switcher twice, analyze the number twice and trigger the new service, and is required to analyze the number on the soft switcher, which wastes resources very much and is very bad for the developing and large scale use of services. For the nested services in the same one service platform, the service platform switches the nested services into the soft switcher, and the soft switcher analyzes the number and then re-switches the nested services to the service platform, which will consume large quantities of bandwidth resources and is also disadvantageous for the service maintenance.

SUMMARY OF THE INVENTION

In view of the above illustration, the main object of the present invention is to provide a method and an apparatus for triggering a nested service, which are able to implement triggering the nested service in the service platform and save the bandwidth resources of the system.

In order to achieve the above object, the technical scheme of the present invention is implemented in the following way:

a method for triggering a nested service comprises:

when receiving a call request of a nested service in a normal service flow, determining a service key of said nested service according to a called number of said nested service, taking said service key as a call access object, converting said call request of the nested service into a call access message in a service platform where a normal service is located, and triggering said nested service in said service platform.

Preferably, said method further comprises:

setting a dedicated nested service match number inside said service platform for said nested service, and configuring a corresponding relationship of said called number of the nested service and said service key of the nested service.

Preferably, said method further comprises:

after receiving a service call request, a call control module of the service platform judging whether a soft switch match number comprises a nested service number prefix, and if the soft switch match number comprises the nested service number prefix, then determining a current call service is the nested service; and if the soft switch match number does not comprise the nested service number prefix, then determining the current call service is the normal service.

Preferably, said method further comprises:

when a call control module of the service platform receives a call request of the normal service, forwarding said call request of the normal service to a Session Initial Protocol (SIP) processing module, and said SIP processing module sending out an INVITE signaling to a specified soft switch to call out and connect a called.

An apparatus for triggering a nested service comprises:

a call control module, adapted for determining a type of a calling-out request message sent by a service logic processing module, forwarding a call request to a service nested module to be processed when the call request is determined as the nested service; and forwarding a received call access message to the service logic processing module;

the service nested module, adapted for determining a service key of said nested service according to a called number in the call request sent by said call control module, taking said service key as a call access object, converting said call request of the nested service into the call access message in a service platform where a normal service is located, and sending the call access message to said call control module; and the service logic processing module, adapted for triggering a corresponding service according to a service key type in the call access message forwarded by said call control module.

Preferably, said apparatus further comprises a SIP processing module, which, on the one hand, is adapted for after receiving a call request of the normal service sent by a soft switch, determining a service key of said normal service according to a call information of said normal service, taking said service key as a call access object, generating a call access message, and sending the call access message to said call control module; and on the other hand, is adapted for sending out an INVITE signaling to a specified soft switch to call out and connect a called when receiving a normal call-out request forwarded by said call control module.

Preferably, said apparatus further comprises:

a setting module is adapted for setting a dedicated soft switch match number inside said service platform for said nested service; and a configuration module is adapted for configuring a corresponding relationship of said called number of the nested service and said service key of the nested service.

Preferably, said call control module determines a type of the call request according to whether the soft switch match number comprising a nested service match number prefix, a current call request is a call request of the nested service when the soft switch match number comprises the nested service match number prefix, and the current call request is a normal call request when the soft switch match number does not comprise the nested service match number prefix.

In the present invention, when the user starts up the nested service in the normal calling process, and when the call control module in the service platform determines that the call is the nested service, the current call request is forwarded to the service nested module, and the service nested module determines its service key according to the called number, and after generating the call access request of the nested service, returns the call access request to the call control module, and the call control module initiates the service access to the service logic processing module. Since the call request of the nested service is not forwarded to the SIP processing module to call out through the soft switch and then the soft switch after analyzing the number, does not access the call into the service platform over again through the SIP processing module, but the service nested module in the service platform completes the transformation of call-out/call-in of the nested service, the bandwidth resources in the system can be saved. The present invention is especially suitable for situations that the nested services largely are started up in the communication system, and the implementation of the scheme of the present invention is simple and practical.

PREFERRED EMBODIMENTS OF THE PRESENT INVENTION

The basic concept of the present invention is: when a user starts up a nested service in a normal call process and a call control module in a service platform determines that the call is a nested service, forwarding a current call request to a service nested module, the service nested module determining its service key according to the called number, and after generating a call access request of the nested service, sending the call access request to the call control module, and the call control module initiating a service access to a service logic processing module. Since the call request of the nested service is not forwarded to a SIP processing module to call out and send to the soft switch to carry out a number analysis, and then entered the service platform over again to carry out the call access, but the service nested module in the service platform completes the transformation of call out/call access of the nested service, the bandwidth resources in the system can be saved. The present invention is particularly suitable for situations that large quantities of the nested services are started up in the communication system, and the implementation of the scheme of the present invention is simple and practical.

In order to make the objects, technical schemes and advantages clearer, below the present invention will be illustrated in detail by embodiments and with reference to the accompanying drawings.

Figure 1:
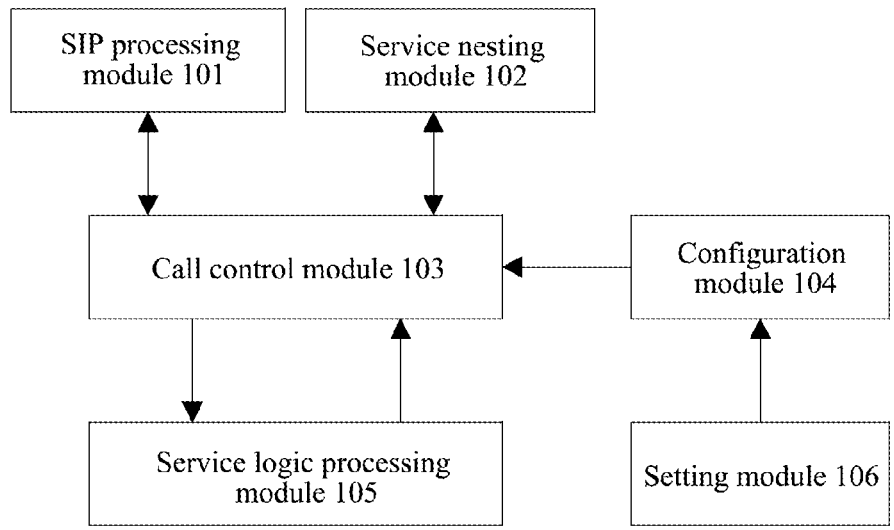
FIG. 1 is a structure diagram of an apparatus for triggering a nested service according to the present invention.

FIG. 1 is a structure diagram of an apparatus for triggering a nested service according to the present invention, and as shown in FIG. 1, the apparatus for triggering the nested service according to the present invention comprises a SIP processing module 101, a service nested module 102, a call control module 103, a service logic processing module 105, a configuration module 104 and a setting module 106, wherein the setting module 106 is used for setting a dedicated soft switch match number inside the service platform and an access code of the normal service for the nested service. For example, there are two telephone services in a certain service platform: a unified voice inquiry service "10000" and a telephone number inquiry "114" service, their access codes for external services respectively are "10000" and "114", these two services can externally provide separate access services, and the "114" service is also a nested service of the "10000" service, for example pressing "1" key in the "10000" service enters into the "114" number inquiry service; and the service platform is required to set a dedicated soft switch match number prefix inside the service platform for the "114" service, for example "4500*", to act as a soft switch match number prefix of the nested service inside the service platform. The configuration module 104 is used for configuring the dedicated soft switch match number to correspond to the nested service, and also configuring the corresponding relationship of the normal called number and the service key at the same time.

For a normal calling-in phone, after receiving an INVITE message sent by the soft switch, the SIP processing module 101 starts a normal call flow, analyzes the called number to detect that it is the "10000" service key, and then forwards the call to the call control module 103; and the call control module 103 forwards the call access message to the service logic processing module 105 to normally trigger the "10000" number service. In the "10000" service flow, if the user presses "1", then the service initiates the call with the head of the soft switch match number being "4500" to the call control module 103.

After receiving the call request that the service demanding to call out, the call control module 103 firstly analyzes whether the current call request is the call request of the nested service or the call request of the common service, and if it is the common call request, then forwards the soft switch index, which is obtained according to the soft switch match number analysis, in combination with other call information together to the SIP processing module 101; and the SIP processing module 101 starts up a normal call flow, and sends out the call request to a specified soft switch. The normal call is completed.

If it is the call request of the nested service, then the current call request is directly forwarded to the service nested module 102; the service nested module 102 determines the service key of the nested service ("114" service) according to the called number (wherein the called number is different from the soft switch match number) "114" of the nested service, takes the service key as the call access object, converts the call request of the nested service into the call access message in the service platform where the nested service is located, and sends to the call control module 103. After receiving the call access message sent by the service nested module 102, the call control module 103 forwards the call access message to the service logic processing module 105, and the service logic processing module 105 then triggers a new service "114", and the service becomes the nested service of the "10000" service at this time. Afterwards, after receiving the call response message of the call control module, the service nested module 102 changes the call index of the response message and then directly returns it to an upper layer, associates the main service call with the nested service call, and stores them together to a session data area to be managed; and the subsequent messages of the session include a request message and an event report and so on, are all carried out the corresponding conversion and forwarding by the service nested module 102, so as to ensure the service flow can be carried out normally until releasing the current call or terminating the nested flow. For the call control module 103 and the service logic processing module 105, the above "10000" service and the "114" service are two different data areas and service flows, which do not adopted differences between nested and nested, but the "114" service is nested by the "10000" service in the view of the user or the service flow.

The SIP processing module 101 is responsible for receiving/sending bottom layer SIP protocol messages, analyzing protocols, assembling messages, analyzing numbers, and managing sessions and so on. The service nested module 102 is dedicatedly responsible for analyzing the numbers of the nested services, converting messages, and managing sessions and so on, and is located in one layer with the SIP processing module in parallel. The call control module 103 is responsible for the maintenance, management and state transition and so on of the call session state machine. The configuration module 104 is used for configuring the soft switch match number, analyzing the called number, and configuring the service key, and synchronizing to the call control module 103, the service nested module 102 and the SIP processing module. The service logic processing module 105 is responsible for the service loading, the service logic processing, and the session management and so on. The service logic processing module 105 triggers different services according to the different service keys sent by the call control module 103.

Figure 2:
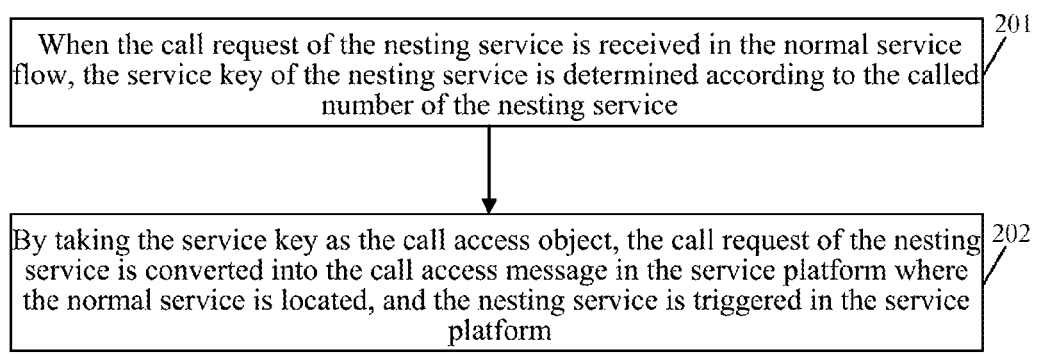
FIG. 2 is a flow chart of a method for triggering a nested service according to the present invention.

FIG. 2 is a flow chart of a method for triggering a nested service according to the present invention, and as shown in FIG. 2, the method for triggering the nested service according to the present invention comprises following steps:

step 201, when the call request of the nested service is received in the normal service flow, the service key of the nested service is determined according to the called number of the nested service.

The user call enters into the service platform through the Soft Switch (SS), the SIP processing module and the call control module normally trigger the service 1, and after establishing the connection successfully, triggers the service 2 of the present service platform according to the demand to nest; at this time, the service 1 sends the call request message down to the call control module by using a specified soft switch match number (as the above mentioned "4500"); and the call control module analyzes the configuration information according to the soft switch match number of the communication system to detect that the call is a nested service, and then forwards the message to the service nested module but not the SIP processing module; then the subsequent nested service flows are all processed by the service nested module, thus it does not need to forward the message to the SS over again to re-enter the service platform once again.

Step 202, the service key is taken as the call access object, the call request of the nested service is converted into the call access message in the service platform where the normal service is located, and the nested service is triggered in the service platform.

The service nested module 102 determines the service key of the nested service according to the called number in the call request message sent by the call control module 103 (which is consistent with the number analysis by the SIP processing module 101), takes the service key as the call access object, converts the call request of the nested service into the call access message in the service platform where the normal service is located, sends the call access message to the call control module 103; the call control module 103 forwards the call access message of the nested service to the service logic processing module 105; the service logic processing module 105 initiates the nested service according to the service key of the nested service; and the service nested module 102 maintains the whole flow of the nested service (wherein the flow belongs to the sub-flow of the nested service).

The above description is only the preferable embodiments of the present invention, and is not intended to limit the protection, scope of the present invention.

What is claimed is:

1. A method for triggering a nested service, comprising:
when a call request of a second service is received by a service platform during a service process of a first service, and the received call request is determined as a call request of a nested service nested within the first service, the service platform forwarding the call request to a service nested module, the service nested module determining a service key of said nested service according to a called number of said nested service, and the service nested module taking said service key as a call access object, converting said call request of the nested service into a call access message in the service platform where the first service is located, and triggering said nested service in said service platform;
wherein the service platform sets a dedicated nested service match number inside said service platform for said nested service, and configures a corresponding relationship of said called number of the nested service and said service key of the nested service; the method further comprising: after receiving a service call request, a call control module of the service platform judging whether a soft switch match number comprises a nested service number prefix, and if the soft switch match number comprises the nested service number prefix, then determining a current call service is the nested service; and if the soft switch match number does not comprise the nested service number prefix, then determining the current call service is the normal service.

2. The method as claimed in claim 1, further comprising:
when a call control module of the service platform receives a call request of the normal service, forwarding said call request of the normal service to a session initial protocol processing module, and said session initial protocol processing module sending out an INVITE signaling to a specified soft switch to call out and connect a call.

3. A service platform, comprising at least one processor executing a call control module, a service nested module, a service logic processing module, a setting module and a configuration module; wherein,
the call control module is configured for receiving a call request of a second service during a service process of a first service, forwarding the call request to said service nested module to be processed when the call request is determined as the call request of a nested service nested within the first service; and is further configured for forwarding a received call access message to said service logic processing module;
the service nested module is configured for determining a service key of said nested service according to a called number in the call request sent by said call control module, taking said service key as a call access object, converting said call request of the nested service into the call access message, and sending the call access message to said call control module;
the service logic processing module is configured for triggering a corresponding service according to a service key type in the call access message forwarded by said call control module;
the setting module is configured for setting a dedicated soft switch match number inside said service platform for said nested service; and
the configuration module is configured for configuring a corresponding relationship of said called number of the nested service and said service key of the nested service;
said call control module is further configured for determining a current call request as the call request of the nested service when the called number comprises a nested service match number prefix; and determining the current call request as the call request of the normal service when the called number does not comprise the nested service match number prefix.

4. The service platform as claimed in claim 3, wherein the at least one processor further executing a session initial protocol processing module, which is configured for, after receiving a call request of the normal service forwarded by said call control module, determining a service key of said normal service according to a call information of said normal service, taking said service key as a call access object, generating a call access message, and sending the call access message to said call control module.

* * * * *